United States Patent
Amanullah et al.

(10) Patent No.: US 11,505,732 B2
(45) Date of Patent: Nov. 22, 2022

(54) SHAPE-ADAPTABLE LOST CIRCULATION MATERIAL FOR MODERATE AND SEVERE LOSS CONTROL

(71) Applicant: SAUDI ARABIAN OIL COMPANY, Dhahran (SA)

(72) Inventors: Md Amanullah, Dhahran (SA); Timothy Eric Moellendick, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/088,799

(22) Filed: Nov. 4, 2020

(65) Prior Publication Data

US 2022/0135863 A1    May 5, 2022

(51) Int. Cl.
*C09K 8/516* (2006.01)
*C09K 8/035* (2006.01)
*E21B 21/00* (2006.01)
*C09K 8/512* (2006.01)

(52) U.S. Cl.
CPC ............. *C09K 8/035* (2013.01); *C09K 8/512* (2013.01); *C09K 8/516* (2013.01); *E21B 21/003* (2013.01); *C09K 2208/04* (2013.01)

(58) Field of Classification Search
None
See application file for complete search history.

(56) References Cited

U.S. PATENT DOCUMENTS

| 9,688,901 | B2 | 6/2017 | Fontenot |
| 10,329,470 | B1 | 6/2019 | Amanullah et al. |
| 2004/0129460 | A1 | 7/2004 | MacQuoid et al. |

(Continued)

FOREIGN PATENT DOCUMENTS

| WO | 2004/109053 A2 | 12/2004 |
| WO | 2015/047389 A1 | 4/2015 |

OTHER PUBLICATIONS

Musaed N. J. Alawad et al., "Innovative Wellbore Strengthening Using Crused Date Palm Seeds and Shredded Waste Car Tyres"; 10th Asian Rock Mechanic Symposium (ARMS10); The 2018 ISRM International Symposium; Oct. 29-Nov. 3, 2018; Singapore (11 pages).

(Continued)

*Primary Examiner* — Andrew Sue-Ako
(74) *Attorney, Agent, or Firm* — Osha Bergman Watanabe & Burton LLP

(57) ABSTRACT

Modified Drilling fluid compositions, lost circulation material compositions and methods for using drilling fluid compositions are provided with enhanced loss control properties where the modified drilling fluid may include a carrier fluid, one or more drilling fluid additives, and a lost circulation shape-adaptable material. The loss lost circulation shape-adaptable material may include a plurality of oval shaped composite particles, wherein the plurality of oval shaped composite particles comprise a first component, a second component, and a high temperature, high pressure (HTHP) binding adhesive. Methods to control lost circulation in a lost circulation zone in a wellbore may include introducing a modified drilling fluid into the wellbore such that the modified drilling fluid contacts the lost circulation zone.

15 Claims, 1 Drawing Sheet

(56) References Cited

U.S. PATENT DOCUMENTS

| | | |
|---|---|---|
| 2012/0108472 A1 | 5/2012 | Wu |
| 2014/0262281 A1* | 9/2014 | Kulkarni .................. C09K 8/03 166/305.1 |
| 2015/0008044 A1 | 1/2015 | Fontenot |
| 2018/0016483 A1* | 1/2018 | Amanullah ............ C09K 8/516 |
| 2019/0249061 A1 | 8/2019 | Alouhali et al. |

OTHER PUBLICATIONS

Md. Amanullah et al., "Date Palm Tree-based Fibrous LCM "ARC Eco-Fiber"—A Better Alternative to Equivalent Imported Products"; Society of Petroleum Engineers, SPE-192160-MS; SPE Kingdom of Saudi Arabia Annual Technical Symposium and Exhibition; Dammam, Saudi Arabia; Apr. 23-26, 2018 (11 pages).

Md Amanullah et al., "A Date Tree Fiber-Based LCM For Severe Loss Control"; International Petroleum Technology Conference, IPTC-20165-MS; Dhahran, Saudi Arabia; Jan. 13-15, 2020 (14 pages).

Md. Amanullah et al., "Date Seed-Based Particulate LCM "ARC Plug"—Its Development, Laboratory Testing and Trial Test Results"; Society of Petroleum Engineers, SPE-187988-MS; Kingdom of Saudi Arabia Annual Technical Symposium and Exhibition; Dammam, Saudi Arabia; Apr. 24-27, 2017 (13 pages).

Md Amanullah et al., "Novel Plant-Based Particulate and Fibrous LCM Products for Loss Control While Drilling"; International Petroleum Technology Conference, IPTC-19305-MS; Beijing, China; Mar. 26-28, 2019 (13 pages).

* cited by examiner

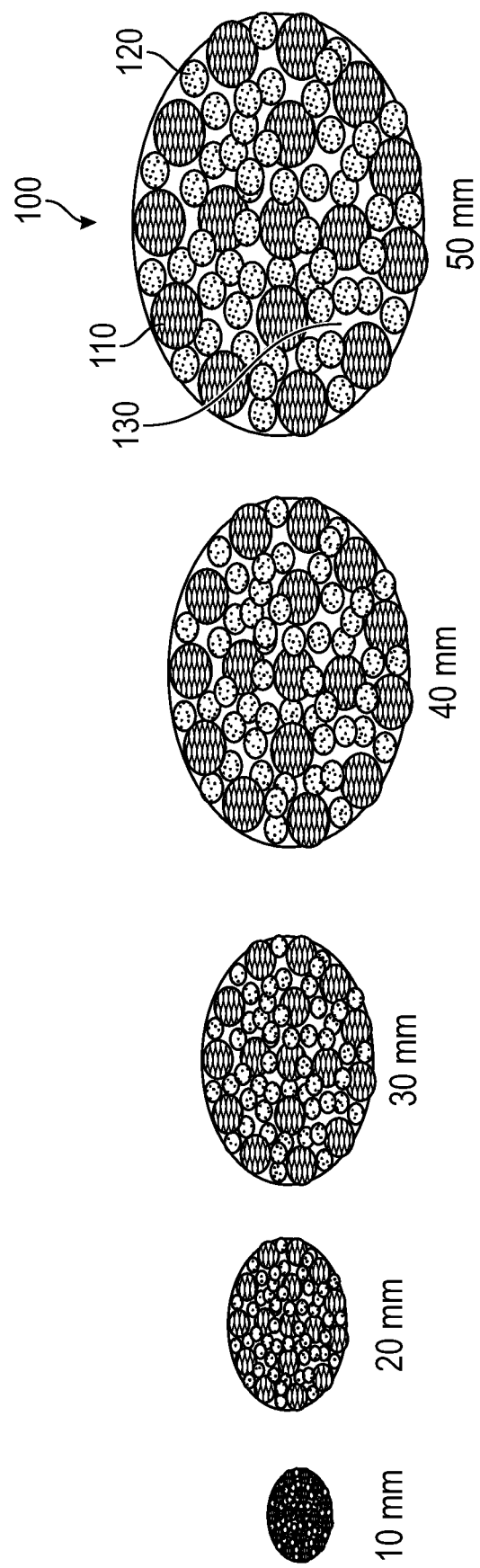

SHAPE-ADAPTABLE LOST CIRCULATION MATERIAL FOR MODERATE AND SEVERE LOSS CONTROL

FIELD OF DISCLOSURE

One or more embodiments of the present disclosure generally relates to lost circulation material (LCM) and use of the LCMs in downhole conditions. LCMs described may be used in the oil and gas drilling industries, or other suitable industries that may drill well bores similar to oil wells and gas wells.

BACKGROUND

Lost circulation is one of the frequent challenges encountered during drilling operations. As a wellbore is drilled, a drilling fluid is continuously pumped into the wellbore to clear and clean the wellbore and the filings. The drilling fluid is pumped from a mud pit into the wellbore and returns again to the surface. A lost circulation zone may be encountered and diagnosed when the flow rate of the drilling fluid that returns to the surface is less than the flow rate of the drilling fluid pumped into the wellbore. It is this reduction or absence of returning drilling fluid that is referred to as lost circulation.

While some fluid loss is expected, fluid loss beyond acceptable norms is not desirable from a technical, an economical, or an environmental point of view. About 75% of the wells drilled per year encounter lost circulation problems to some extent. Lost circulation is associated with well control problems, such as borehole instability, pipe sticking, unsuccessful production tests, poor hydrocarbon production after well completion, and formation damage due to plugging of pores and pore throats by mud particles. In extreme cases, lost circulation problems may force abandonment of a well.

Lost circulation can be categorized as seepage type, moderate type, severe type, and total loss in referring to the amount of fluid or mud lost. The extent of the fluid loss and the ability to control the lost circulation with lost circulation (or control) materials (LCMs) depends on the type of formation in which the lost circulation occurs. Typically, the sizes of the geological voids can be correlated to whether the potential for drilling fluid loss fits into one of these four categories. Formations with low permeability zones, that is, those with microscopic cracks and fissures, usually have seepage type lost circulation. Other formations may experience lost circulation if an improper mud weight is used while drilling.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one aspect, embodiments disclosed relate to lost circulation material compositions including a plurality of oval shaped composite particles. The lost circulation material compositions comprised of oval shaped composite particles may include a high temperature, high pressure (HTHP) binding adhesive, a first component, where the first component comprises a plurality of spherical rigid particles, and a second component, where the second component comprises resilient particles. The lost circulation material compositions comprised of oval shaped composite particles may include first component particles and the second component particles that are bound together by the HTHP binding adhesive to form the plurality of composite geometric shaped-adaptable particles.

In a further aspect, embodiments disclosed relate to methods including modified drilling fluids that include a carrier fluid, one or more drilling fluid additives, and a lost circulation shape-adaptable material comprising a plurality of oval shaped composite particles. In the methods, the plurality of oval shaped composite particles may include a first component, a second component, and a high temperature, high pressure (HTHP) binding adhesive, where the first component comprises rigid date seed particles and the second component comprises resilient rubber particles.

In another aspect, embodiments disclosed relate methods to control lost circulation in a lost circulation zone in a wellbore. The methods may include introducing a modified drilling fluid into the wellbore such that the modified drilling fluid contacts the lost circulation zone. The modified drilling fluid may include a carrier fluid, one or more drilling fluid additives, and a lost circulation shape-adaptable material comprising a plurality of oval shaped composite particles. The lost circulation shape-adaptable material comprising plurality of oval shaped composite particles may include a first component, a second component, and a high temperature, high pressure (HTHP) binding adhesive polymer, where the first component comprises rigid date seed particles and the second component comprises resilient rubber particles.

Other aspects and advantages will be apparent from the following description and the appended claims.

BRIEF DESCRIPTION OF DRAWINGS

FIG. 1 shows a representative schematic of different sized LCM composite particles that include a resilient component, a rigid component, and an adhesive that binds the components together.

DETAILED DESCRIPTION

Embodiments in accordance with the present disclosure generally relate to compositions and methods of a lost circulation modified drilling fluid and a fluid lost circulation material composition. One or more embodiments relate to compositions and methods that can improve upon the prevention of moderate and severe lost circulation problems encountered in the presence of permeable formations.

Many LCM products, compositions, blends, engineered pills, lost circulation slurries, and tailored-made formulations exist and have been proposed for preventing and mitigating loss of circulation. However, based on the variety of loss control zones, there is a continuous need for the identification and development of novel products, improved compositions of lost circulation formulations, and superior LCM blends for effective sealing and blocking of loss zones.

Lost circulation materials (LCM) are used to mitigate the lost circulation by blocking the path of the drilling fluid (such as drilling mud) into the formation. The type of LCM used in a lost circulation situation depends on the extent of lost circulation and the type of formation. Different types of LCMs, such as particulate, granular, fibrous and flaky materials, are frequently used alone or in combination to control loss of circulation. For example, different types of sized particulate lost circulation materials are used to combat loss of circulation either as a background material in the mud system, as a component of an LCM pill, or as a lost circulation slurry. The purpose of the particulate material is to assist in creation of an effective and stable seal or plug in the loss zone and to maintain the integrity of the seal or plug in changing borehole conditions. One or more embodiments of the present disclosure relates to a shape-adaptable LCM composition that may be used in an LCM pill or a lost circulation slurry.

One or more embodiments of the present disclosure relate to shape-adaptable LCM compositions and modified drilling fluids comprising shape-adaptable LCM compositions. Embodiments of the present application also relate to methods of manufacturing shape-adaptable LCM compositions.

Loss zones are often dominated by fractures of differing sizes that may be more effectively sealed and blocked by shape-adaptable LCM, which includes a resilient elastic component in combination with a rigid component. This combination of resilient and rigid character can provide for improved structural support and resilient behavior. The combination of resilient and rigid character can also allow for limited morphology alteration and increased tolerance in response to high external load or pressures that may be experienced by the composite particles. These characteristics may provide the shape-adaptable LCM composition with improved properties to resist excessive deformation. The shape-adaptable LCM composition of the present disclosure may comprise LCM that is spherical or of an oval shape in configuration and may have one or more dimensions.

Furthermore, because these shape-adaptable LCMs can be fabricated by using elastically resilient particles that can be reclaimed from scrap rubber (such as discarded automobile tires, which are numerous), environmental benefits may be enjoyed through the reduction in the amount of landfill associated with the discarded tires. Additionally, the date seed-based particulate shape-adaptable LCM material described in the present disclosure may be chemically inert, physically granular, mechanically strong, biodegradable, environmentally-friendly, and non-toxic.

One or more embodiments relate to methods of using modified drilling fluid compositions that may provide improved sealing and blocking capacity or partial lost circulation for targeted moderate to severe loss zones, in comparison to conventional drilling fluids. Such zones may be defined as those losing more than 100 barrels (bbls) per hour, where "barrel" refers to a standard oilfield barrel having a volume of 42 U.S. gallons. Additional non-limiting examples of severe lost circulation include greater than 30 barrels per hour (bbl/hr), or greater than 50 barrels per hour (bbl/hr). Moderate lost circulation is a term for any lost circulation between seepage lost circulation and severe lost circulation and consists of any medium rate of lost circulation, for example, between 10 to 100 barrels per hour (bbl/hr), 10 to 50 barrels per hour (bbl/hr), or 10 to 30 barrels per hour (bbl/hr).

The presence of moderate and severe loss zones containing large voids, vugs, gaps, fractures and permeable channels of high fluid conductivity, often trigger moderate and severe loss of circulation. This loss of circulation requires sealing and blocking of these loss zones for safe and trouble-free drilling to resume. However, conventional and special LCM materials and pills are not suitable for moderate and severe loss zones containing gaps and voids of more than 10 mm (millimeter) in size. The LCMs of this disclosure are directed to addressing the various shapes and sizes of fractures in loss zones.

The ranges of this disclosure may be expressed in the disclosure as from about one particular value, to about another particular value, or both. When such a range is expressed, it is to be understood that another embodiment is from the one particular value, to the other particular value, or both, along with all combinations within said range.

Lost Circulation Material Composition

One or more embodiments of the present disclosure may relate to a modified drilling fluid including a shape-adaptable LCM composition with enhanced lost circulation properties, a carrier fluid, and one or more drilling fluid additives, where the shape-adaptable LCM composition includes a plurality of LCM composite particles.

In one or more embodiments, the shape-adaptable LCM of the present disclosure is capable of undergoing specific and controlled alteration of their shape and size to conform to the vugs, voids, gaps, fractures and permeable channel morphologies under the action of wellbore pressure and other in situ stresses experienced in a wellbore environment.

In one or more embodiments, the shape-adaptable LCM composite particles may have a spherical or oval shaped morphology. In one or more embodiments, the shape-adaptable LCM composite particles may be formed from a resilient particle and a rigid particle that is mixed with an adhesive and molded to form composite particles. For example, in one or more embodiments the shape-adaptable LCM composition may include a plurality of composite shape-adaptable LCM particles where each particle may include a combination of a first component of rigid date seed particles and a second component of resilient rubber particles. The individual rigid and resilient particles may be specifically sized and provided in selected ratio with respect to each other depending upon the ultimate properties of the environment in which they will be used.

The first rigid component may be one or more of date seed particles, granular marble, sand, or a combination thereof. In some embodiments, the date seed particles may include spherical particles having a particle size distribution, as determined by the diameters of the particles passed or retained in mesh openings, of less than about 6 millimeters (mm), such as a particle size that ranges from about 1 mm to about 5 mm. In one or embodiments, the shape-adaptable LCM composite particle may comprises up to 75 percent of the rigid particle by weight (wt %), from 25 to 75 wt % rigid particle, or from 40 to 60 wt % rigid particle, with respect to the combined weight of the rigid and resilient component of the composite particle.

The rigid particles, such as date seeds, may act as a supporting material within the shape-adaptable LCM composite particle to prevent excessive morphology deformation under the pressure and in situ stress. This rigid characteristic can serve to prevent the breakdown of the shape-adaptable LCM composite particles to ensure effective sealing and blocking of moderate and severe loss zones containing gaps, voids, vugs, and fractures of 10 mm or more.

As disclosed, in one or more embodiments, the date seed-based spherical particulate component of the shape-adaptable LCM composite particle may include treated or untreated date palm seed particles. As used in the disclosure, the term "untreated" or "without treating" refers to not treated with alkali or acid, not bleached, not chemically altered, not oxidized, and without any extraction or reaction process other than possibly drying of water. The term "untreated" or "without treatments" does not encompass grinding or heating to remove moisture but does encompass chemical or other processes that may change the characteristics or properties of the shape-adaptable LCM. In accordance with this definition, an shape-adaptable LCM that is treated may behave in a manner different than its original starting material. In such embodiments, the date palm seed particles may be manufactured without treating before, during, or after crushing, grinding, drying, or any other processing.

In one or more embodiments, the resilient particle component may be one or more of natural rubber, synthetic rubbers latex, resin, or combinations thereof. For example, in one or more embodiments the resilient particle may be an elastic rubber particle, such as spent tire particles. In some embodiments, the resilient particles may include spherical particles having a particle size distribution, as determined by the diameters of the particles passed or retained in mesh openings, of less than about 10 millimeters (mm), such as a particle size that ranges from about 2 mm to about 10 mm. In one or embodiments, the shape-adaptable LCM composite particle may comprises up to 75% of the resilient particle component by weight (wt %), from 25 to 75 wt % resilient particle component, or from 40 to 60 wt % resilient particle component, with respect to the combined weight of the rigid and resilient components of the composite particle.

The term "resiliency" refers to characteristic of the particulate material that provides elastic deformation of the resulting LCM composite particle under pressure and in situ stress. The resilient nature of the elastic component may further impart properties that allow for the LCM composite material to regain the shape and size of its original morphology when pressure and in situ stresses are reduced. The resilient rubber particles may also act as shock absorbers. They may have sufficient resiliency to prevent the ultimate failure, decomposition, or break-down, of the shape-adaptable LCM composite particle.

The resilient particle may impart an adaptable property to the shape-adaptable LCM composite particle. This adaptable property may provide for improved deformation of the shapes through subterranean formation due to the adaption of the shape under the force of mud pressure during circulation, transportation and placement into the subterranean loss zones. The adaption characteristics of the shape-adaptable LCM can also provide for improved sealing properties when used to seal and block moderate and severe loss zones.

Adhesive

In one or more embodiments, the shape-adaptable LCM composite particle may include a water and oil resistant high temperature and high pressure (HTHP) stable adhesive. The adhesive may have high thermal, chemical, mechanical, physical and tribological stability. The adhesive may be included in the shape-adaptable LCM composite particle to bind the rigid particles, such as date seed particulate, and the resilient particles, such as spent tire particles, to form an LCM composite particle that can adapt its shape and size under in situ pressure and stresses.

In one or more embodiments, the adhesive binder may be a starch, polymer binder, such as polyurethane, or glue that does not degrade or breakdown at elevated temperatures, such as those found in a wellbore. A combination of these binders may also be included. In one or more embodiments, starch based adhesives or binding agents may be used in conditions up to 120° C. For applications and environments with elevated temperatures greater than 120° C., a high temperature stable polymeric glue or binder, such as CMC (carboxymethyl cellulose), PAC (polyanionic cellulose), sodium silicate, polyvinyl alcohol, or a combination thereof, may be used. One or more embodiments may include a polymer adhesive that may include polyurethane-based material. The polyurethane based material of one or more embodiments may refer to a synthetic resin polymer adhesive composed of organic units joined by urethane links. Examples of the polyurethane-based materials that may be used as the binder can include, but are not limited to, latex or oil modified polyurethane. Other polyurethanes may also be used as long as the strength of the bonds in the adhesive binder are sufficient to form the resulting LCMs. In one particular form, the polyurethane may be solvent-free.

In one or embodiments, the shape-adaptable LCM composite particle may comprise up to 30% adhesive by volume (vol %), from 10 to 40 vol % adhesive, or from 20 to 30 vol % adhesive.

Composite Shape-Adaptable LCM

Referring to FIG. 1, an array of different sized LCM composite particles may be prepared. In FIG. 1 the LCMs of spherical or oval morphology and variable sphere dimensions ranging from about 10 to about 50 mm sizes are shown. In one form, the oval-shaped composite shape-adaptable LCMs 100 comprise a plurality of resilient polymer particles 110 and rigid particles 120, such as date seed particulate. The composite shape-adaptable LCM particle 100 may further comprise an adhesive 130 that is dispersed between the plurality of resilient polymer particles 110 and the rigid particles 120 such that the two bind and form a singular, cohesive unit. The resulting spherical or oval-shaped shape-adaptable LCMs 100 form a both resilient and form-holding material that is malleable, ductile, deforms without failure, and shrinks under pressure to enter fractures. The shape-adaptable LCM can also have adequate chemical resistance to wellbore fluids.

The resilient particles 110 can be mixed with the rigid particles 120 and the adhesive 130 such that the polymer adhesive 130 is dispersed between the plurality of particles, binding the mixture of particles 120 together and holding the mixture of particles 120 in place throughout the shape-adaptable spherical or oval-shaped shape-adaptable LCMs 100.

In one or more embodiments, the shape-adaptable LCM composite particles may have an oval or spherical morphology with a long axis dimension ranging from about 10 mm to about 50 mm and short axis dimension ranging from about 5 mm to about 25 mm. In one or more embodiments, shape-adaptable LCM composite particles may have an oval morphology with a long axis dimension ranging from 1, 10, 15, 20, 25, 30, 35 and 40 mm to 10, 20, 30, 40, 50 and 60 mm, where any lower limit may be combined with any mathematically feasible upper limit. In one or more embodiments, the shape-adaptable LCM composite particles may have an oval morphology with a short axis dimension ranging from 1, 5, 10, 15, and 20 mm to 10, 15, 20, 25, 30 mm, where any lower limit may be combined with any mathematically feasible upper limit.

In one or more embodiments, the rigid and resilient particles of the shape-adaptable LCM composite particles may have random distribution, symmetric distribution, asymmetric distribution, spiral distribution, patterned distribution, or a combination thereof, with respect to both the size and concentration of the rigid and resilient particles in the LCM composite particle.

The shape-adaptable LCM composite particles may be prepared in a manner such that the resulting composite particles also have a high resilience so that they may return to their original shape after being subjected to a load. In other words, the shape-adaptable LCM should be ductile and malleable with good conformal characteristics to adapt to various sizes according to the dimensions of any pores or fractures. This adaptable character may be selected and altered by controlling the variation of concentration of the rigid and resilient particle mix, which can result in LCM composite particles with varied adaptable and resilient behavior. For example, shape-adaptable LCMs prepared with lower concentration of resilient particles can have less adaptable behavior compared to shape-adaptable LCM composite particles prepared with a higher concentration of resilient particles.

Additionally, shape-adaptable LCM composite particles that include a greater concentration of resilient particles may be characterized as having an overall higher degree of resiliency such that they may return to a shape and size that is close to their original shape after the partial or total withdrawal of any acting load, provided the acting load was less than the elastic limit of the rubber particles. As long as the applied pressure, or load, is less than the elastic limit of the resilient component of the shape-adaptable LCM composite particles, the LCM composite particles should experience negligible degrees of permanent or long term particle shape deformation.

Shape-adaptable LCMs can be prepared by mixing the resilient and rigid components in a ratio ranging from 25:75, 50:50 or 75:25, by weight, relative to the combined weight of both the resilient and rigid components. For example, the combination of rigid and resilient particles can be mixed together with an adhesive to create inter-particle bonding. After mixing with an adhesive, the composite particle can then be placed in a spherical mold to cure and create the mechanically strong, chemically resistive, thermally stable, tribologically wear resistant shape-adaptable LCMs. In one or more embodiments, the binding can take between 1.5 and 3 hours. The composite shape-adaptable LCM particles may then be transferred to an oven and left for 8 to 12 hours at a temperature of about 60° C. In one or more embodiments, shape adaptable LCMs may be prepared by mixing a combination of prepared composite particles with varying ratios of resilient particle to rigid particles. For example, in some embodiments, the shape-adaptable LCM composition may include a plurality of composite particles prepared with a ratio of resilient particles to rigid particles that is 25:75, a plurality of composite particles with a ratio of resilient particles to rigid particles that is 50:50, and a plurality of composite particles prepared with a ratio of resilient particles to rigid particles that is 75:25.

Shape-Adaptable LCM Modified Drilling Fluid

The shape-adaptable LCM composite particles include a plurality of various sizes of spheres and ovoids that may be added to water or oil-based carrier fluids or drilling muds to create an altered carrier fluid or drilling mud to transport and place the shaped LCM into the loss zones to prevent or reduce the loss of whole mud. In some embodiments, a plurality of shape-adaptable LCM composite particles may be added directly to a water-based drilling mud or carrier fluid to create an altered water-based carrier fluid or drilling mud having the shape-adaptable LCM of spherical morphology to fulfil the functional tasks. In some embodiments, the plurality of shape-adaptable LCM may also be added to an oil-based carrier fluid or drilling mud to create an altered oil-based carrier fluid or drilling mud having the shape-adaptable LCM of spherical morphology to fulfill the functional tasks.

In one or more embodiments the modified drilling fluid may include an LCM composition in an amount ranging from 1, 10, 20, 30, 40, and 50 ppb (pounds per barrel) to 20, 30, 35, 40, 45, 50, and 60 ppb, where any lower limit may be combined with any mathematically feasible upper limit. As will be appreciated, the specific selection of sizes and concentration of the shape-adaptable LCM may vary depending on the shapes of the gaps, voids, fractures, vugs, and sizes of the loss zone as well as the mechanism of introduction of the shape-adaptable LCM into the lost circulation zone.

In one or more embodiments of the present disclosure, the modified drilling fluid may include an oil-based carrier fluid or an aqueous based carrier fluid. In one or more embodiments, the carrier fluid may include one or more drilling fluid additives, such as wetting agents, organophilic clays, viscosifiers, surfactants, dispersants, interfacial tension reducers or emulsifying agents, rheological modifies, pH buffers, mutual solvents, thinners, thinning agents, weighting agents, and cleaning agents. Drilling fluid additives may be added in amounts suitable to achieve the specific characteristics of the target fluid profile.

In one or more embodiments of the present disclosure, the shape-adaptable LCM composition may be capable of reducing fluid loss in a well formation at temperatures of less than 300° F. and up to 500 pounds per square inch (psi). The shape-adaptable LCM composite particles may maintain at least 70% shape stability, where the composite particle may undergo deformation but the composite particle integrity will not be compromised, in conditions up to 300° F. and up to 500 psi. In one or more embodiments, a modified drilling fluid including the shape-adaptable LCM composition prepared in accordance with one or more embodiments of the present disclosure, can be introduced into the wellbore such that the modified drilling fluid contacts the lost circulation zone and results in the reduction of rate of lost circulation into the lost circulation zone. In one or more embodiments, the modified drilling fluid may be introduced into the wellbore such that the modified drilling fluid contacts the lost circulation zone and results in the reduction of rate of lost circulation, where the reduced rate of lost circulation of a fluid portion of the altered drilling fluid is less than 20% of the initial loss volume.

In one or more embodiments, the shape-adaptable LCM composition may be added to a drilling fluid including oil-based muds (OBMs), such as those including diesel, mineral oil, and synthetic oil, or any other oil based fluid known to one skilled in the art. In one or more embodiments the shape-adaptable LCM composition may be added to a drilling fluid including aqueous based fluids, such as water based fluids, synthetic and natural salt water and brines, and any other aqueous based drilling fluid known to those skilled in the art.

The oleaginous fluid may be any suitable fluid, such as oil or a solution containing both oil and one or more organic or inorganic compounds dissolved in the oil or otherwise completely miscible with the oil. The oleaginous fluid may include at least one naturally-derived or synthetically-derived oil. The oleaginous fluid may include oils derived from petroleum, such as mineral oils; diesel oils; linear or branched olefins; polyolefins; alkanes; paraffins; esters of fatty acids; straight chain, branched or cyclical alky ethers of fatty acids; other petroleum-derived oils; or combinations of any of these. The oleaginous fluid may contain esters, ethers, acetals, dialkylcarbonates, hydrocarbons, or combinations of any of these. The oleaginous fluid may also include oils derived from animals or plants, for example. The oleaginous fluid may also include other oils, such as, but not limited to, poly diorganosiloxanes, siloxanes, organosiloxanes, other silicone-based oils, or combinations of these.

An aqueous based fluid may be any suitable fluid, such as water or a solution containing both water and one or more organic or inorganic compounds dissolved in the water or otherwise completely miscible with the water. The aqueous fluid in some embodiments may contain water, including freshwater, well water, filtered water, distilled water, sea water, salt water, produced water, formation brine, other type of water, or combinations of waters. In embodiments, the aqueous fluid may contain brine, including natural and synthetic brine. The aqueous fluid may include water containing water-soluble organic compounds, such as alcohols, organic acids, amines, aldehydes, ketones, esters, or other polar organic compounds, or salts dissolved in the water. In some embodiments, the aqueous fluid may include salts, water-soluble organic compounds, or both, as impurities dissolved in the water. Alternatively, in embodiments, the aqueous fluid may include salts, water-soluble organic compounds, or both, to modify at least one property of the aqueous fluid, such as density. In some embodiments, increasing the amount of salt, water-soluble organic compounds, or both, may increase the density of the drilling fluid. In some embodiments, salts that may be present in the aqueous fluid may include metal salts, such as sodium salts, calcium salts, cesium salts, zinc salts, aluminum salts, magnesium salts, potassium salts, strontium salts, silicates, lithium salts, or combinations of these, for example. The metal salts may be in the form of chlorides, bromides, carbonates, hydroxides, iodides, chlorates, bromates, formates, nitrates, sulfates, phosphates, oxides, fluorides, or combinations of these.

Additive

In some embodiments, the drilling fluid may also contain an additive. One or more additives may be any additives known to be suitable for drilling fluids. For example, in one or more embodiments, the drilling fluid may comprise one or more additional additives, such as weighting agents, filler, fluid loss control agents, lost circulation control agents, defoamers, rheology modifiers (or viscosifiers), an alkali reserve, specialty additives, pH adjuster, shale inhibitors, and combinations thereof. One or more additives may be incorporated into the drilling fluid to enhance one or more characteristics of the drilling fluid.

In one or more embodiments, the drilling fluid may contain from about 2 wt % to about 30 wt % of the one or more additives based on the weight of the drilling fluid. In one or more embodiments, the drilling fluid may contain from 2.0, 2.5, 3.0, 4.0, 5.0, 6.0, 7.0, 8.0 10, 12, 14, and 16 wt % to 3.0, 3.5, 4.0, 5.0, 6.0, 7.0, 8.0, 10, 12, 14, 18, 20, 23, 25 and 30 wt % of the one or more additives based on the weight of the drilling fluid, where any lower limit may be combined with any mathematically feasible upper limit.

In one or more embodiments the lost circulation composition may include additional materials including fillers, such as date seed-based particulate, a date tree "fiber" mix, RevDust™ (from Milwhite Inc; Brownsville, Tex., sized calcium carbonates of various grades), or a combination thereof. In one or more embodiments, the drilling fluid may contain from about 1 wt % to about 20 wt % of the filler, based on the weight of the drilling fluid. In one or more embodiments the drilling fluid may contain from 1, 3, 5, 7, 9, 10, 12, 14 and 15 wt % to 12, 14, 16, 17, 18, 19 and 20 wt % of the filler component based on the total weight of the drilling fluid, where any lower limit may be combined with any mathematically feasible upper limit.

One or more embodiments of the present disclosure may include a lost circulation blend composition comprising the date seed-based particulate product referred to as a date seed "plug" as described in "Md. Amanullah, Mohammed Al-Arfaj, Ahmed Gadalla, Rami Saleh, Ihab El-Habrouk, Bader Al-Dhafeeri, *Date Seed-based Particulate LCM "ARC Plug"—Its Development, Laboratory Testing and Trial Test Results*, Saudi Aramco Journal of Technology, Fall 2017, at 27," that is incorporated by reference. The date palm seed-based particulate lost circulation material described in the present disclosure may be chemically inert, physically granular, mechanically strong, biodegradable, environmentally-friendly and non-toxic. In one or more embodiments, the date palm seed-based particulate lost circulation material may be prepared by drying a plurality of date palm seeds and grinding the plurality of date palm seeds to produce the plurality of untreated particles. In some embodiments, the date palm seed particles may include particles having a particle size distribution, as determined by the diameters of the particles passed or retained in mesh openings, of less than about 4000 microns (that is, particles passing through sieve mesh size number 5) with a particle size that ranges from about less than 149 microns to about less than 4000 microns. In some embodiments, the date palm seed particles may include particles having a particle size distribution that may be referred to as course, medium, fine, or super fine. In one or more embodiments, the particle may be ground or milled to produce a specific particle size that may be tailorable to a specific pore size, fracture size or vug size.

In one or more embodiments, date palm seed particles may be prepared where the particles may have a diameter ranging from about 800 microns to about 2850 microns. In other embodiments, date palm seed particles may be prepared such that the particles may have a diameter ranging from about 300 microns to about 850 microns. In some embodiments, date palm seed particles may be prepared such that the particles may have a diameter ranging from about 100 microns to about 300 microns. In yet other embodiments, date palm seed particles may be prepared such that the particles may have a diameter ranging from less than about 40 microns to about 110 microns.

As provided, one or more embodiments of the present disclosure may include a lost circulation blend composition comprising a date tree "fiber" mix material formulation that may include date tree trunk fibers produced from date tree trunks, date tree leaf and leaf stem fibers produced from date tree leaves and leaf stems, and date tree panicle fibers produced from date tree panicles, as described in "Md. Amanullah, Mohammed Arfaj, Raed Alouhali, *Novel Plant-Based Particulate and Fibrous LCM Products for Loss Control*, Saudi Aramco Journal of Technology, September 2019, at 31," that is incorporated by reference. In one or more embodiments, the date tree fiber blend composition may include a mix of date tree fibers obtained from date tree waste to mitigate or prevent lost circulation in a well, as well as provide seepage control and minimize or prevent fluid loss. As used in the disclosure, the term date tree waste refers to the waste produced from farming and processing date trees (also referred to as "date palms"), such as in the production of date fruits (also referred to as "dates"). In one or more embodiments, the length of the fibers in the LCM fibrous formulation may range from 800 to 1200 microns. In one or more embodiments, the length of the fibers in the LCM fibrous formulation may range from about 100 microns to about 1500 microns. In other embodiments, the length of the fibers in the LCM fibrous formulation may range from about 300 microns to about 850 microns. In some embodiments, the length of the fibers in the LCM fibrous formulation may range from about 100 microns to about 400 microns. The varying blends may blend sizes may be combined to form a composite date tree "fiber" mix.

One or more additives may be incorporated into the drilling fluid to enhance one or more characteristics of the drilling fluid. For example, a viscosifier may be added to the drilling fluid to impart non-Newtonian fluid rheology to the drilling fluid to facilitate lifting and conveying rock cuttings to the surface of the wellbore. Examples of viscosifiers may include, but are not limited to, bentonite, montmorillonite clay, kaolin, ($Al_2Si_2O_5(OH)_4$ or kaolinite), polyacrylamide, polyanionic cellulose (PAC-R™, commercially available from M-I SWACO, Houston Tex.), XC polymer, carboxymethyl cellulose (CMC) and combinations of these. In some embodiments, the drilling fluid may include xanthan gum, a polysaccharide commonly referred to as XC polymer (commercially available from M-I SWACO, Houston Tex.). The XC polymer may be added to the drilling fluid to produce a flat velocity profile of the drilling fluid in annular flow, which may help to improve the efficiency of the drilling fluid, in particular reduced density drilling fluids, in lifting and conveying rock cuttings to the surface.

Embodiments of the drilling fluid composition may optionally include from about 0.2 wt % to about 1.0 wt % viscosifier based on the weight of the drilling fluid composition. In other embodiments, drilling fluid composition may optionally include from 0.2 wt % to 0.8 wt %, from 0.2 wt % to 0.6 wt %, from 0.2 wt % to 0.4 wt %, from 0.4 wt % to 0.8 wt %, from 0.4 wt % to 0.6 wt %, viscosifier, based on the total weight of the drilling fluid composition. Unless otherwise stated, the weight percent of an additive in the drilling fluid composition is based on the weight of the drilling fluid composition Method One or more embodiments may include a method of preparation of a lost circulation fluid to prevent or reduce moderate to severe lost circulation while drilling subsurface loss zones of a wellbore. Methods of preparation may include a water or oil-based carrier fluid or drilling mud and a lost circulation additive comprising of a plurality of shape-adaptable LCMs of spherical or oval morphology. The LCM composite particles of the LCM composition may include rigid particles to provide mechanical support and resilient particles to provide for adaption of the spherical shape under acting pressure and in situ stresses. The composition may further include a HTHP stable polymer adhesive to bind the rigid and resilient particles in the matrix. The method includes preparing a drilling fluid by combining a drilling fluid with an LCM composition, and optionally, one or more drilling fluid additives, and introducing the drilling fluid into the severe loss zone such that a plurality of shape-adaptable LCMs become lodged in at least one fracture that defines the severe loss zone.

In one or more embodiments, the LCM composition comprising the plurality of composite particles may be added directly to a drilling fluid, such as a drilling mud, to form a modified drilling fluid having the shape-adaptable LCM formulation. For example, in some embodiments, the shape-adaptable LCM composition may be added to (for example, blended with) an oil-based drilling mud. In some embodiments, the shape-adaptable LCM composition may be added at the mud pit of a mud system. In some embodiments, the shape-adaptable LCM composition may be added to a drilling fluid in an amount in the range of about 10 ppb to about 50 ppb. After addition of the shape-adaptable LCM composition to a drilling fluid, the modified drilling fluid may be circulated at a pump rate effective to position the modified drilling fluid into contact with a lost circulation zone in a wellbore such that the shape-adaptable LCM composition alters the lost circulation zone (for example, by entering and blocking porous and permeable paths, cracks, and fractures in a formation in the lost circulation zone, such as forming a structure (for example, a plug or seal) in a mouth or within a fracture). In one or more embodiments, the drilling fluid may be an oil based mud including one or more drilling fluid additives.

In one or more embodiments the shape-adaptable LCM composition may be added stepwise or simultaneously along with additional drilling fluid additives to a drilling fluid, such as a drilling mud, to create a modified drilling fluid having the shape-adaptable LCM composition.

EXAMPLES

The following examples are merely illustrative and should not be interpreted as limiting the scope of the present disclosure.

Example 1: Lost Circulation Material Composition

The composition of Example 1 was prepared by adding 20 vol % polyurethane, with respect to the total volume of the binder, and particle components, to a mixture of 50 wt % rigid date seed particles and 50 wt % resilient scrap tire particles, where the weight percent of the particles are only relative to the particle component of the mixture. The mixture was then mixed homogeneously using a wooden stick. After adequate mixing, the blend was placed in an oval-shaped die and the oval-shaped die was placed in an oven at 60° C. for curing. This curing of the polyurethane polymer may serve to create strong chemical bonds between the distinct date seed particles and the resilient scrap tire particles. Liquid polyurethane was effectively mixed with the rigid and resilient particles to create strong and effective inter-particle bonding under the thermal energy through heating at 60° C. The absorption of the polyurethane to the surface of the particle coupled with heat serves to enhance the chemical interactions and facilitate crosslinking of polyurethane coated rigid and resilient particles. This produces a strong network of inter-particle bonds to form the composite shape adaptable oval-shaped LCMs.

This process may also be used to produce different size composite particles by using dies of various sizes. Also shapes with various rigid and resilient characteristics can be made by varying the concentration of the rigid and the resilient particles in the shape adaptable oval shaped LCMs. Other shape adaptable LCMs, such spherical, capsule shaped, and disc shaped, can also be made using appropriate dies, 3-D (3 dimensional) printing, and hand crafting. Placement of the composite shape in water, mineral oil and also hot water showed no alteration or deformation or dispersion of the particles used to produce the shaped LCMs.

Example 2: 10 mm Composite LCM Shape Adaptable Particles

Example 2 was prepared by using the same method has Example 1 with varied amounts of the resilient particles and where the size of the oval-shaped die was adjusted to prepare a 10 mm composite particle. In Example 2, the 10 mm shape adaptable oval shaped LCM composition shown in FIG. 1 was prepared. The 10 mm particles were determined to have a major axis equal to 10 mm and a minor axis equal to 5 mm. It is believed to be suitable for use in loss zones containing vugs and fractures of about 5 mm to less than about 10 mm in size.

The composite particles of Example 2 were prepared with a combination of resilient and rigid materials to produce the oval shaped adaptable LCMs with variable resiliency. The variable resiliency of the composite LCM composition is provided by combining composite particles with varied ratios of resilient particles, and rigid particles. The LCM composition was prepared with composite particles that were prepared by mixing 75 wt % resilient, 25 wt % rigid materials, with respect to each other, and 20 vol % polyurethane binding agent, with respect to the total weight of the composite particle composition. These shape adaptable composite LCMs were designed for higher resiliency and larger adaptation character to squeeze into smaller fractures of this fracture size range under the action of overbalance pressure. The composition further included oval shaped adaptable LCMs with 50 wt % resilient particles, 50 wt % rigid materials and 20 vol % binding agent that were designed for medium resiliency and moderate adaptable character to squeeze into intermediate size fractures of this fracture size range under the action overbalance pressure. The LCM composition also included oval shaped composite particles that were prepared with 25 wt % resilient particles, 75 wt % rigid materials and 20 wt % binding agent that was designed for low resiliency and smaller adaptable character to squeeze into larger fractures of this fracture size range under the action overbalance pressure.

Example 3: 30 mm Composite LCM Shape Adaptable Particles

The 30 mm adaptable oval shaped LCMs shown in FIG. 1 have a major axis equal to 30 mm and a minor axis equal to 15 mm and may be used in loss zones containing vugs and fractures of 10 mm to less than 30 mm in size. The composite LCM shape adaptable particles of Example 3 were prepared by using the same method as described in Example 1 with varied amounts of the resilient and rigid particles, as detailed in Example 2, where the size of the oval-shaped die was adjusted to prepare a 30 mm composite particle.

Example 4: 50 mm Composite LCM Shape Adaptable Particles

The 50 mm adaptable oval shaped LCMs shown in FIG. 1 have a major axis equal to 50 mm and a minor axis equal to 25 mm and may be used in loss zones containing vugs and fractures of 30 mm to less than 50 mm in size. The composite LCM shape adaptable particles of Example 4 were prepared by using the same method as described in Example 1 with varied amounts of the resilient and rigid particles, as detailed in Example 2, where the size of the oval-shaped die was adjusted to prepare a 50 mm composite particle.

Example 5: Water-Based Mud System Including Shape Adaptable LCM Composition

Table 1 shows the composition of the clay-based aqueous drilling system that has been used as the LCM carrier fluid of the modified drilling fluid comprising the loss control material composition. As the components of the LCM blend composition were added to a field water-based system, which has some drilling solids in the system, a field mud sample was selected to be the best representation of the carrier fluid. The field mud was prepared in accordance with one or more embodiments of the present disclosure to demonstrate a drilling fluid formulation comprising the LCM blend compositions of one or more embodiments of the present disclosure. In Table 1, "cc" means cubic centimeters and "gm" means grams.

TABLE 1

| Water-based System Composition. | |
|---|---|
| Components | Amount |
| WATER (cc) | 340 |
| SODA ASH (gm) | 0.2-0.5 |
| BENTONITE (gm) | 25 |
| CAUSTIC SODA (gm) | 0.20-0.35 |
| XC POLYMER (gm) | 0.5-1.0 |
| Shape Adaptable LCMs (gm) | 15 |

Example 6: Oil-Based Mud System Including Shape Adaptable LCM Composition

Table 2 shows the composition of the OBM system that has been used as the LCM carrier fluid of the modified drilling fluid comprising the loss control material composition. As the components of the LCM blend composition were added to a field OBM system, which has some drilling solids in the system, a field mud sample was selected to be the best representation of the carrier fluid. The field mud was prepared in accordance with one or more embodiments of the present disclosure to demonstrate a drilling fluid formulation comprising the LCM blend compositions of one or more embodiments of the present disclosure.

TABLE 2

| Mud System Composition | |
|---|---|
| Components | Amount |
| BASE OIL (cc) | 186 |
| INVERMUL (cc) | 10 |
| EZ-MUL (cc) | 6 |
| LIME gram (gm) | 5 |
| VISCOSIFIER (gm) | 6 |
| FLUID LOSS ADDITIVE (gm) | 5 |
| WATER (cc) | 1.2 |
| $CaCl_2$ (gm) | 61 |
| $CaCO_3$ F (gm) | 25 |
| $CaCO_3$ M (gm) | 20 |
| $CaCO_3$ C (gm) | 15 |
| Shape Adaptable LCMs (gm) | 15 |

Although the preceding description has been described here with reference to particular means, materials and embodiments, it is not intended to be limited to the particulars disclosed here; rather, it extends to all functionally equivalent structures, methods and uses, such as those within the scope of the appended claims.

The presently disclosed systems, apparatuses, methods, processes and compositions may suitably comprise, consist or consist essentially of the elements disclosed and may be practiced in the absence of an element not disclosed. For example, those skilled in the art can recognize that certain steps can be combined into a single step.

Unless defined otherwise, all technical and scientific terms used have the same meaning as commonly understood by one of ordinary skill in the art to which these systems, apparatuses, methods, processes and compositions belong.

All patent applications, patents, and printed publications cited are incorporated by reference in the entireties, except for any definitions, subject matter disclaimers or disavowals; except to the extent that the incorporated material is inconsistent with the express disclosure made, in which case the language in this disclosure controls; and where such reference is permissible for incorporation by rule or law.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

When the word "approximately" or "about" are used, this term may mean that there can be a variance in value of up to ±10%, of up to 5%, of up to 2%, of up to 1%, of up to 0.5%, of up to 0.1%, or up to 0.01%.

"Optionally" means that the subsequently described event or circumstances may or may not occur. The description includes instances where the event or circumstance occurs and instances where it does not occur.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

The invention claimed is:

1. A lost circulation material composition comprising:
a plurality of oval shaped composite particles comprising:
a high temperature, high pressure (HTHP) binding adhesive in an amount that ranges from 10 to 40 percent by volume (vol %);
a first component, wherein the first component comprises a plurality of spherical rigid particles;
a second component, wherein the second component comprises resilient rubber particles;
wherein the spherical rigid particles are date seed particles;
wherein the plurality of spherical rigid particles are comprised in an amount that ranges from 25 wt % to 75 wt %, with respect to a combined weight of rigid and resilient components of the oval shaped composite particles; and
wherein the first component particles and the second component particles are bound together by the HTHP binding adhesive such that the lost circulation material is shape-adaptable.

2. The composition of claim 1, wherein the plurality of spherical rigid particles have a diameter of between 1 mm to 6 mm each.

3. The composition of claim 1, wherein the plurality of resilient rubber particles have a diameter of between 2 mm to 10 mm each.

4. The composition of claim 1, wherein the plurality of oval shaped composite particles have a long-axis dimension of between 1 mm to 60 mm, and a short axis dimension of between 1 and 30 mm, each.

5. The composition of claim 1, wherein the HTHP binding adhesive is selected from the group consisting of polyurethane, CMC (carboxymethyl cellulose), PAC (Polyanionic cellulose), sodium silicate, polyvinyl alcohol, or a combination thereof.

6. A modified drilling fluid comprising:
a carrier fluid;
one or more drilling fluid additives; and
a lost circulation shape-adaptable material comprising a plurality of oval shaped composite particles, wherein the plurality of oval shaped composite particles comprise a first component, a second component, and a high temperature, high pressure (HTHP) binding adhesive,
wherein the first component comprises a plurality of spherical rigid particles being date seed particles and the second component comprises resilient rubber particles;
wherein the plurality of spherical rigid particles are comprised in an amount that ranges from 25 wt % to 75 wt %, with respect to a combined weight of rigid and resilient components of the oval shaped composite particles;
wherein the oval shaped composite particles comprise the HTHP binding adhesive in an amount that ranges from 10 to 40 percent by volume (vol %); and
wherein the first component particles and the second component particles are bound together by the HTHP binding adhesive.

7. The modified drilling fluid of claim 6, wherein the lost circulation shape-adaptable material is comprised in an amount ranging from 1 to 50 ppb, with respect to the modified drilling fluid.

8. The modified drilling fluid of claim 6, wherein the one or more drilling fluid additives is selected from a group consisting of wetting agents, organophilic clays, viscosifiers, surfactants, dispersants, interfacial tension reducers or emulsifying agents, rheological modifies, pH buffers, mutual solvents, thinners, thinning agents, weighting agents, and cleaning agents, or a combination thereof.

9. The modified drilling fluid of claim 6, wherein the carrier fluid is an aqueous-based fluid.

10. A method to control lost circulation in a lost circulation zone in a wellbore comprising:
introducing a modified drilling fluid into the wellbore such that the modified drilling fluid contacts the lost circulation zone, wherein the modified drilling fluid comprises:
a carrier fluid;
one or more drilling fluid additives; and
a lost circulation shape-adaptable material comprising a plurality of oval shaped composite particles, wherein the plurality of oval shaped composite particles comprise a first component, a second component, and a high temperature, high pressure (HTHP) binding adhesive polymer,
wherein the first component comprises a plurality of spherical rigid particles being date seed particles and the second component comprises resilient rubber particles;
wherein the plurality of spherical rigid particles are comprised in an amount that ranges from 25 wt % to 75 wt %, with respect to a combined weight of rigid and resilient components of the oval shaped composite particles;
wherein the oval shaped composite particles comprise the HTHP binding adhesive in an amount that ranges from 10 to 40 percent by volume (vol %); and
wherein the first component particles and the second component particles are bound together by the HTHP binding adhesive.

11. The method of claim 10, further comprising introducing the modified drilling fluid to the lost circulation zone through a drill string disposed within the wellbore.

12. The method of claim 10, wherein the lost circulation shape-adaptable material is comprised in an amount ranging from 1 to 50 ppb, with respect to the modified drilling fluid.

13. The method of claim 10, wherein the rigid date seed particles have a diameter of between 1 mm to 6 mm each.

14. The method of claim 10, wherein the resilient rubber particles have a diameter of between 2 mm to 10 mm, each.

15. The method of claim 10, wherein the lost circulation shape-adaptable material seal and block a loss zone containing fractures, vugs, cavernous channels, gaps and voids of more than 10 mm in size.

\* \* \* \* \*